Nov. 10, 1959  W. F. HUCK  2,911,847
BACKLASH TAKE-UP GEARS
Filed Feb. 4, 1957

INVENTOR
WILLIAM F. HUCK

BY Homer R Montague
ATTORNEY

United States Patent Office
2,911,847
Patented Nov. 10, 1959

2,911,847

BACKLASH TAKE-UP GEARS

William F. Huck, Forest Hills, N.Y., assignor to Huck Co., New York, N.Y., a partnership of New York Application February 4, 1957, Serial No. 638,052

9 Claims. (Cl. 74—440)

This invention relates to power transmission means of the type utilized in rotary punches, dies, shears and the like, and more particularly to backlash take-up gears for use in such power transmissions.

In those machines where holes of desired configuration are punched out of stock material by means of rotary dies, extreme accuracy is required to assure the alignment of male and female dies. This requirement of extreme accuracy in alignment of the male and female dies presents an acute problem when gears are utilized in the power transmission because of the inherent development of backlash when wear develops in the gear train.

Various expedients are known in the prior art to compensate for the wear of the gears utilized for this purpose. One such device provides two gears mounted upon the same shaft, one gear being keyed to the shaft while the other gear is adjustably mounted upon the same shaft. Both of these gears mesh with an opposite gear to eliminate backlash. Devices of this type have not proved satisfactory in general because as these gears become worn, the male punch on the male cylinder will move with respect to the opening on the opposite female cylinder, and thus gradually get out of alignment which must be held within very close tolerances.

It is an object of this invention to provide a gear train for rotary punches and the like which will eliminate backlash and thus retain the original alignment of one rotary member relative to another rotary member within extremely close tolerances regardless of the extent of gear wear.

It is another object of this invention to provide a gear train power transmission for use with rotary punches and the like which will permit retention of the original alignment of one rotary member with respect to another within extremely close tolerances despite variations of the center distance between the gears in the power train.

It is another object of this invention to provide an anti-backlash gear for use in rotary punch power trains in which proper alignment of parts actuated by the power train is kept constant regardless of gear wear and variations in the center distance between the anti-backlash gear and its driven gear.

Another object of this invention is to provide an anti-backlash gear made of two gear halves mounted upon the same shaft but biased in different directions to compensate for wear in either one or both halves.

The foregoing as well as other objects and advantages will readily become apparent when the following specification is read in conjunction with the accompanying drawings in which.

Figures 1, 2:
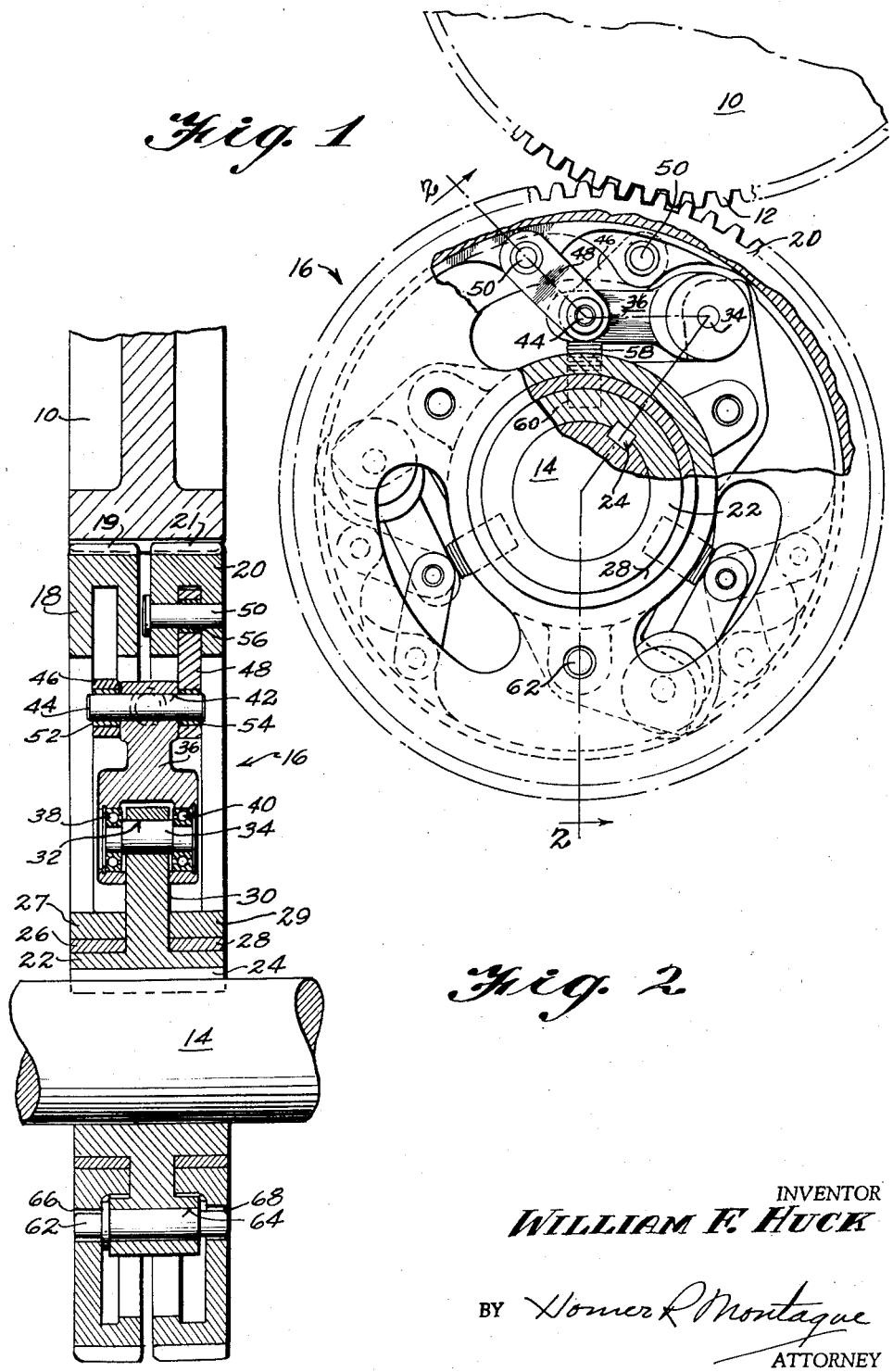
Figure 1 is a side elevational view partly in section of an anti-backlash gear train drive for rotary punches or the like embodying this invention.
Figure 2 is a developed cross-sectional view of the device in Figure 1 taken along the zig-zag plane 2—2 of Figure 1.

Referring to the drawings, the reference numeral 10 indicates a driven gear having teeth 12 around its circumference. The gear 10 by virtue of its shaft (not shown) transmits the desired amount of rotation to a punch (not shown) or other like tool. The desired amount of rotation of the punch alignment gear 10 is accomplished by rotation of a power shaft 14 through an anti-backlash gearing arangement shown in detail in the two figures of the drawing and indicated generally by the reference numeral 16.

The anti-backlash gear arrangement includes two separate narrow gears 18 and 20 fitted on oposite sides of a center divided hub 22 which is fastened to the power shaft 14 by means of a key 24. The gear 18 is provided with teeth 19 around its circumference, and gear 20 is likewise provided with teeth 21. The gear teeth 19 and 21 mesh with the gear teeth 12 of the punch alignment gear 10. To permit the two separate gears 18 and 20 to rotate independently on the hub 22, two sleeve bearings 26 and 28 are pressed into ring portions 27, 29 of the gears 18 and 20. The two separate gears 18 and 20 forming part of the anti-backlash arrangement 16 may be referred to in this specification and claims as gear halves, since the total face width of these two gears will be equal to no more and preferably less than the face width of the punch alignment gear 10.

The hub 22 is formed with a plurality of spokes or arms 30. In each of the hub arms 30 is provided an opening 32 to receive a pin 34 force-fitted into the opening 32, and which serves as a shaft about which a bifurcated swivel arm 36 pivots on bearings 38 and 40. The bearings 38 and 40 are so designed as to reduce friction to an absolute minimum.

The bifurcated swivel arm 36 is provided on its opposite end with an opening 42 into which is force fitted a pivot pin 44 about which two connecting links 46, 48 may be rotated. The opposite ends of the links 46, 48 are connected to gears 18 and 20 respectively by means of pins 50. Bearings 52, 54 and 56 are provided to enable the links 46 and 48 to rotate or pivot freely about the pins 44 and 50. As illustrated in Figure 1, each pair of links 46 and 48 are pivoted at right angles to each other for a purpose that will be explained below.

A spring 58 is set in an opening 60 in the hub 22 directly beneath each swivel arm 36. The spring 58 constantly urges the end of the bifurcated swivel arm 36 upwards, and this force, transmitted by links 46 and 48, each being urged in an opposite direction tends to rotate the gear 18 counterclockwise, and the gear 20 in a clockwise direction an equal amount. This biasing by means of the spring 58 assures that each gear 18 and 20 will be rotated an equal angle but in opposite directions with respect to the hub 22.

In order to limit the amount of angular travel of each of the gears 18 and 20, a stop or limit arrangement is provided by means of a stop pin 62 which is press fitted into an opening 64 in the hub 22. The stop pin 62 bears against the sides of a pair of oversized openings 66, 68 provided in gears 18 and 20 respectively. The maximum amount of relative rotation between the two gear halves 18 and 20 can be fixed or determined as desired by the choice of the sizes of the stop pin 62 or the stop pin openings 66, 68 or both.

In the anti-backlash gear construction just described all wear is compensated for automatically and no manual adjustments are necessary once the device is set up for operation. The amount of wear which can be compensated for automatically depends of course upon the dimensions of the stop pin 62 and the stop pin openings 66 and 68.

Although the anti-backlash gear construction has been described in conjunction with a rotary punch machine, it is obvious that this invention will be of great value in any gear train in which the effects of wear upon the gears must be compensated for to eliminate backlash in the gear train.

Having thus described the invention, what is claimed is:

1. In a rotary punch machine or the like, a first rotary gear member for actuating a punch, a second rotary member rotatively coacting with said first rotary gear, a power shaft for said second rotary member, a center divided hub secured to said shaft, a narrow gear mounted on each side of said center divided hub, each of said narrow gears being independently and rotatably mounted on said hub, an arm having a bifurcated end pivotally mounted on the center divider of said hub, a pair of linkage members pivotally mounted on the other end of said arm, each linkage member being pivotally connected to one of said narrow gears, and means to resiliently bias said arm whereby each of said narrow gears is urged to rotate in a different direction.

2. The combination as described in claim 1 in which means is provided to limit the biased rotational movement of each of the narrow gears.

3. The combination as described in claim 1 in which said resilient means to bias the bifurcated arm includes a spring mounted in said hub and contacting the outer end of said arm.

4. The combination as described in claim 1 in which the combined face width of the two narrow gears is less than the face width of said first rotary gear member.

5. Anti-backlash gearing for connecting two shafts for rotation, one by the other, in precise angular relationship independently of tooth wear and of slight changes in the center-to-center spacing of the shafts, comprising a first gear unit having a body portion, means for securing said body portion fixedly to a first shaft, a pair of similar toothed ring gears concentrically mounted on said body portion for limited relative rotation about the axis of said first shaft, mechanism connecting said ring gears to said body portion and to one another for conjoint movement of the ring gears by equal amounts in opposite directions with respect to said body portion, and means for resiliently biasing said ring gears toward one extremity of their limited relative rotation; and a second gear unit meshing with both ring gears of said first gear unit, said second gear unit being connected to a second shaft.

6. Ant-backlash gearing in accordance with claim 5, in which said mechanism comprises an arm pivoted at one end on said body portion and links arranged as a toggle connecting the other end of the arm to the respective ring gears.

7. Anti-backlash gearing in accordance with claim 6, in which said means for resiliently biasing the ring gears comprises a spring connecting said arm to said body portion.

8. Anti-backlash gearing in accordance with claim 5, in which there are a plurality of said mechanisms distributed symmetrically about the axis of said gear unit.

9. In an anti-backlash gear, a body portion, means for securing said body portion fixedly to a shaft, a pair of similar toothed ring gears concentrically mounted on said body portion for limited relative rotation about the axis of said shaft, mechanism connecting said ring gears to said body portion and to one another for conjoint movement of the ring gears by equal amounts in opposite directions with respect to said body portion, and means for resiliently biasing said ring gears toward one extremity of their limited relative rotation.

References Cited in the file of this patent

UNITED STATES PATENTS

| | | |
|---|---|---|
| 1,648,715 | Bean | Nov. 8, 1927 |
| 2,206,831 | Berthelson | Mar. 7, 1938 |
| 2,235,898 | Niemeyer | Mar. 25, 1941 |
| 2,343,110 | Hale | Oct. 30, 1942 |
| 2,548,603 | Hallstrand | Apr. 10, 1951 |
| 2,583,371 | Guttmann | Jan. 22, 1952 |